US012786134B2

(12) United States Patent
Aijaz

(10) Patent No.: US 12,786,134 B2
(45) Date of Patent: Nov. 3, 2026

(54) INTEGRATED TSN AND 5G SYSTEM

(71) Applicant: Kabushiki Kaisha Toshiba, Tokyo (JP)

(72) Inventor: Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 435 days.

(21) Appl. No.: 18/449,391

(22) Filed: Aug. 14, 2023

(65) Prior Publication Data

US 2025/0062999 A1 Feb. 20, 2025

(51) Int. Cl.
*H04L 47/32* (2022.01)
*H04J 3/02* (2006.01)
(Continued)

(52) U.S. Cl.
CPC ................ *H04L 47/32* (2013.01); *H04J 3/02* (2013.01); *H04L 45/24* (2013.01); *H04J 3/0667* (2013.01)

(58) Field of Classification Search
CPC .. H04L 47/32; H04L 45/24; H04J 3/02; H04J 3/0667
See application file for complete search history.

(56) References Cited

U.S. PATENT DOCUMENTS 11,477,833 B2 10/2022 Miklós et al.
11,564,123 B2 1/2023 Aijaz
(Continued)

FOREIGN PATENT DOCUMENTS

CN 113676967 A 11/2021
JP 2023-517240 A 4/2023
(Continued)

OTHER PUBLICATIONS

"3rd Generation Partnership Project; Technical Specification Group Services and System Aspects; Release 16 Description; Summary of Rel-16 Work Items (Release 16)", 3GPP TR 21.916 V16.2.0, Jun. 2022, 165 pages.
(Continued)

*Primary Examiner* — Jay L Vogel
(74) *Attorney, Agent, or Firm* — Oblon, McClelland, Maier & Neustadt, L.L.P.

(57) ABSTRACT

A method of transmitting data between a time-sensitive networking, TSN, system and a 5G network, the method comprising receiving, from the time-sensitive networking, TSN, system, data comprising a plurality of frames, defining k disjoint paths for transmitting the data across the 5G network, where k≥2 and for each frame of the data, performing, by the 5G network, at least one of the processes (a) and (b), (a) transmitting k copies of the frame to a transmission destination via a respective one of the disjoint paths, determining, based on a redundancy policy of the 5G network indicating a protocol for deleting redundant copies of frames of TSN traffic, whether one or more of the transmitted k copies received at the transmission destination are redundant and eliminating the copies determined to be redundant and (b) generating, based on a redundancy policy of the 5G network indicating a protocol for replicating frames of TSN traffic, k copies of the frame; and transmitting the copies of the frame to a transmission destination via a respective one of the disjoint paths.

17 Claims, 9 Drawing Sheets

(51) Int. Cl.

| | |
|---|---|
| ***H04J 3/06*** | (2006.01) |
| ***H04L 45/24*** | (2022.01) |

(56) References Cited

U.S. PATENT DOCUMENTS

| | | | | |
|---|---|---|---|---|
| 2020/0084663 | A1* | 3/2020 | Park | H04W 8/08 |
| 2020/0107213 | A1 | 4/2020 | Park et al. | |
| 2020/0259896 | A1* | 8/2020 | Sachs | H04L 67/12 |
| 2020/0359440 | A1* | 11/2020 | Qiao | H04W 76/11 |
| 2021/0258817 | A1 | 8/2021 | Kolding et al. | |
| 2021/0306901 | A1* | 9/2021 | Mannweiler | H04L 12/40 |
| 2022/0225165 | A1 | 7/2022 | Park et al. | |
| 2022/0345928 | A1 | 10/2022 | Park et al. | |
| 2022/0360537 | A1 | 11/2022 | Varga et al. | |
| 2022/0368626 | A1 | 11/2022 | Varga et al. | |
| 2023/0105937 | A1 | 4/2023 | Varga et al. | |
| 2024/0323088 | A1* | 9/2024 | Bush | H04L 41/0894 |
| 2024/0414792 | A1* | 12/2024 | Miklós | H04W 76/11 |

FOREIGN PATENT DOCUMENTS

| | | | | |
|---|---|---|---|---|
| WO | WO-2021/115561 | A1 | 6/2021 | |
| WO | WO 2022/115561 | A1 | 6/2022 | |
| WO | WO-2022171261 | A1 * | 8/2022 | H04W 76/12 |
| WO | WO-2023/042124 | A1 | 3/2023 | |
| WO | WO-2023/110052 | A1 | 6/2023 | |

OTHER PUBLICATIONS

IEEE 802.1 Working Group, "IEEE Standard for Local and metropolitan area networks—Frame Replication and Elimination for Reliability", IEEE Std 802.1CB™—2017, IEEE Standards Association, IEEE Computer Society, Sep. 28, 2017, 102 pages.

Aijaz et al., "The Tactile Internet for Industries: A Review", Proceedings of the IEEE, vol. 107, No. 2, Feb. 2019, 22 pages.

AIJAZ "Private 5G: The Future of Industrial Wireless", IEEE Industrial Electronics Magazine, vol. 14, No. 4, Dec. 2020, 10 pages.

Huawei, et al., "Protocol stack or Solutions#3 and evaluation for Solution#3 and Solutions#4", SA WG2 Meeting #128bis. S2-188395 (revision of S2-168232), Aug. 2018. 18 pages.

China Mobile, et al., "Evaluation of solutions for 5G URLLC KI #1", SA WG2 Meeting #129BIS, S2-1811801, Nov. 2018, 5 pages.

SA WG2. "Presentation of TR: TR 23.725, Version 1.0.0: "Study on enhancement of Ultra-Reliable Low-Latency Communication (URLLC) support in the 5G Core network (5GC)" for information," TSG SA Mesting #SP-81. SP-180745, Sep. 2018, 62 pages.

Japanese Office Action issued Feb. 4, 2025 in Japanese Patent Appilcation No. 2024-028426 (with English translation), 21 pages.

Japanese Office Action issued Jul. 8, 2025 in Japanese Patent Application No. 2024-028426 (with English Translation), 20 pages.

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725 V1.0.0, Third Generation Partnership Project (3GPP), Sep. 2018, 59 pages.

Song et al., "Time synchronization performance analysis considering the frequency offset inside 5G-TSN network", 2021 17th International Symposium on Wireless Communication Systems (ISWCS) [online], IEEE Standards Association, 2021, 6 pages.

Ambrosy et al., "5G packet delay considerations for different 5G-TSN communication scenarios", 2023 IEEE 21st International Conference on Industrial Informatics (INDIN), IEEE Standards Association, 2023, 6 pages.

* cited by examiner

UE user equipment RAN - radio access network UPF - user plane function
DN - data network AMF - access and mobility management function NEF - network exposure function
SMF - session management function AF- application function NSSF - network slice selection function
N3IWF - non-3GPP interworking function UDM - unified data management PCF - policy control function

INTEGRATED TSN AND 5G SYSTEM

FIELD

Embodiments described herein relate generally to communications, more particularly to wireless communications and even more generally to communication in integrated TSN and 5G Systems.

BACKGROUND

Time-sensitive networking (TSN) is a technology, underpinned by a set of standards within the IEEE 802.1 working group, that aims to improve real-time capabilities of standard Ethernet. TSN provides guaranteed data delivery with deterministic and bounded latency and extremely low data loss. TSN supports both time-critical and best-effort traffic over a single standard Ethernet network.

TSN is likely to co-exist with high-performance wireless technologies like 5G. Therefore, integration of TSN and 5G is desirable in the envisioned digital transformation of industrial systems.

One approach proposed in 3GPP Release 16 is the bridge model wherein the 5G system appears as a virtual TSN bridge or a black box to the TSN system. The 5G system handles TSN service requirements through its internal protocols and procedures. It provides (logical) ingress and egress ports for the TSN system. The 5G system may provide virtual bridge functionality to multiple TSN domains.

One of the standards in IEEE 802.1 family is the 802.1CB standard which provides fault tolerance to TSN systems through a frame replication and elimination for reliability (FRER) solution. FRER replicates each frame at source over multiple paths and provides an elimination mechanism for redundant frames at the destination. An example protocol stack for FRER is shown in FIG. 1.

In the following, embodiments will be described with reference to the drawings in which.

Figure 3:
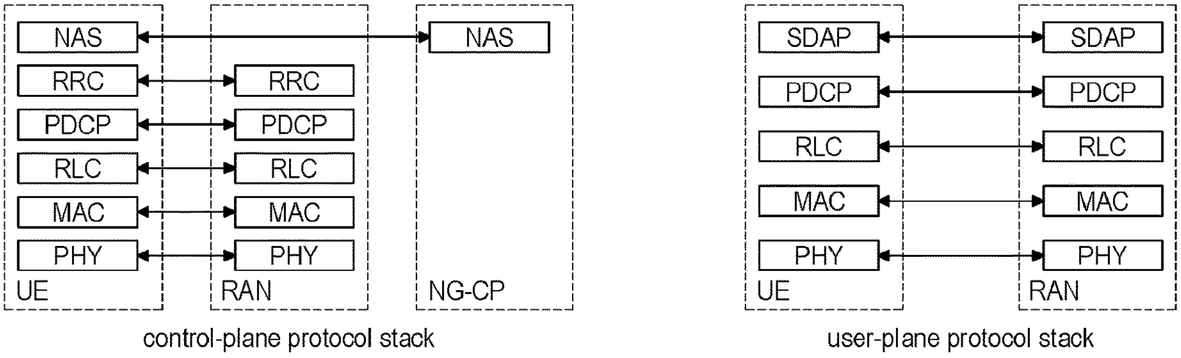
Figure 4:
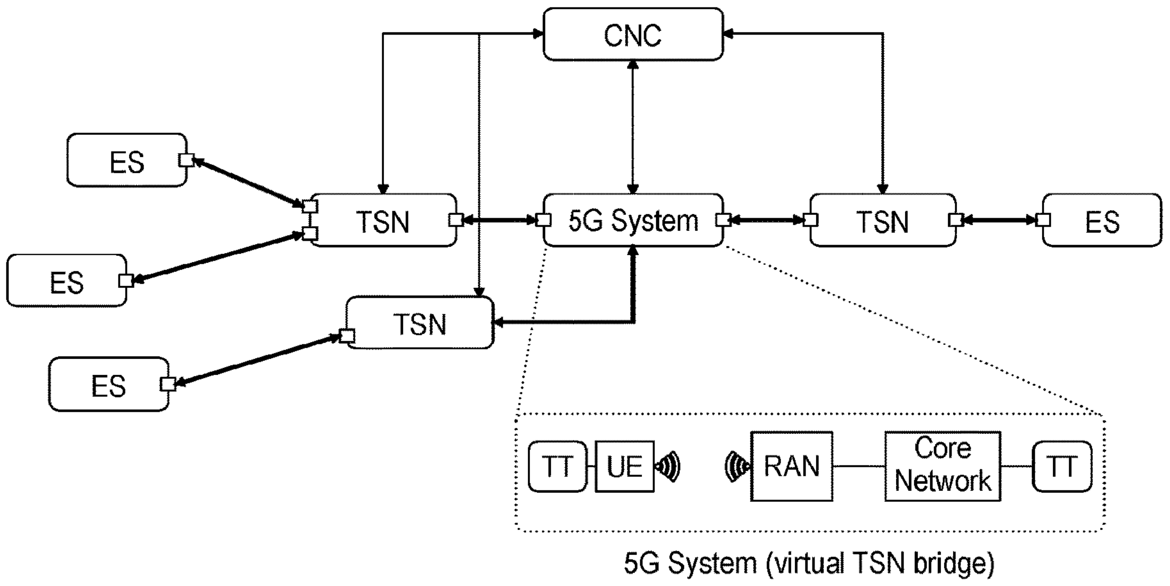
Figure 5:
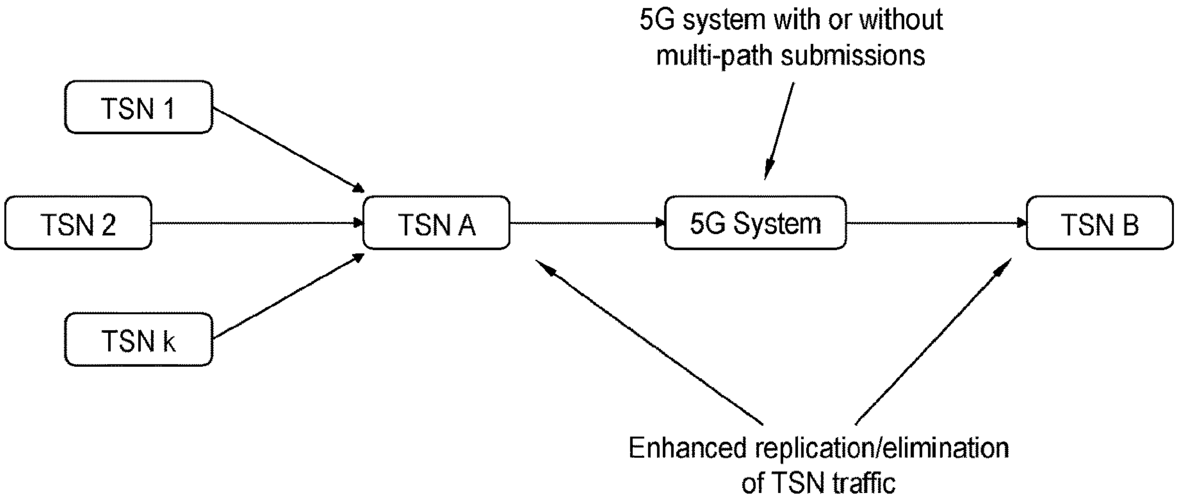
Figure 6:
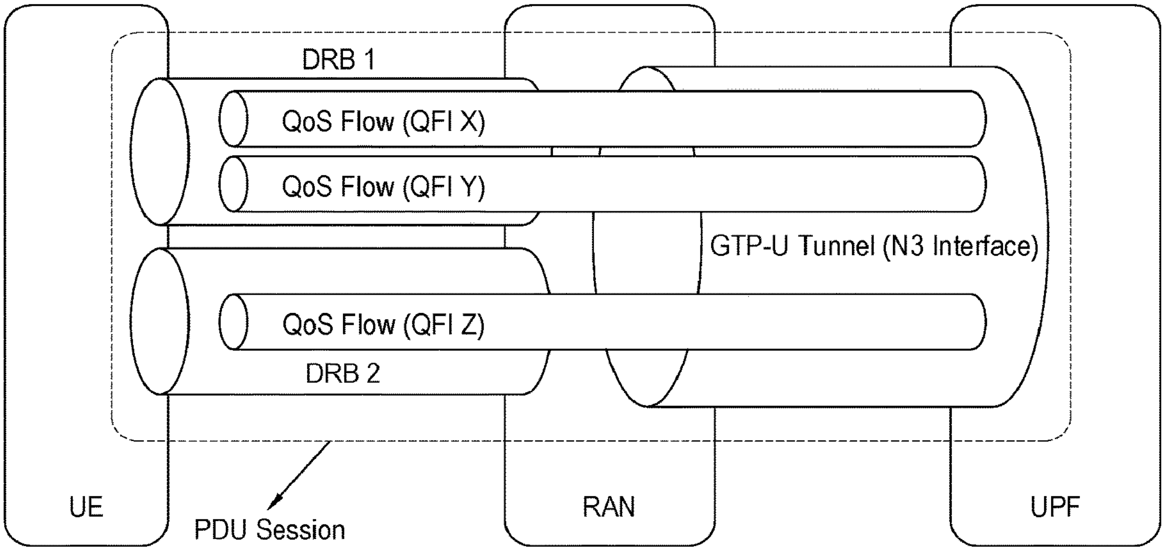
Figure 7:
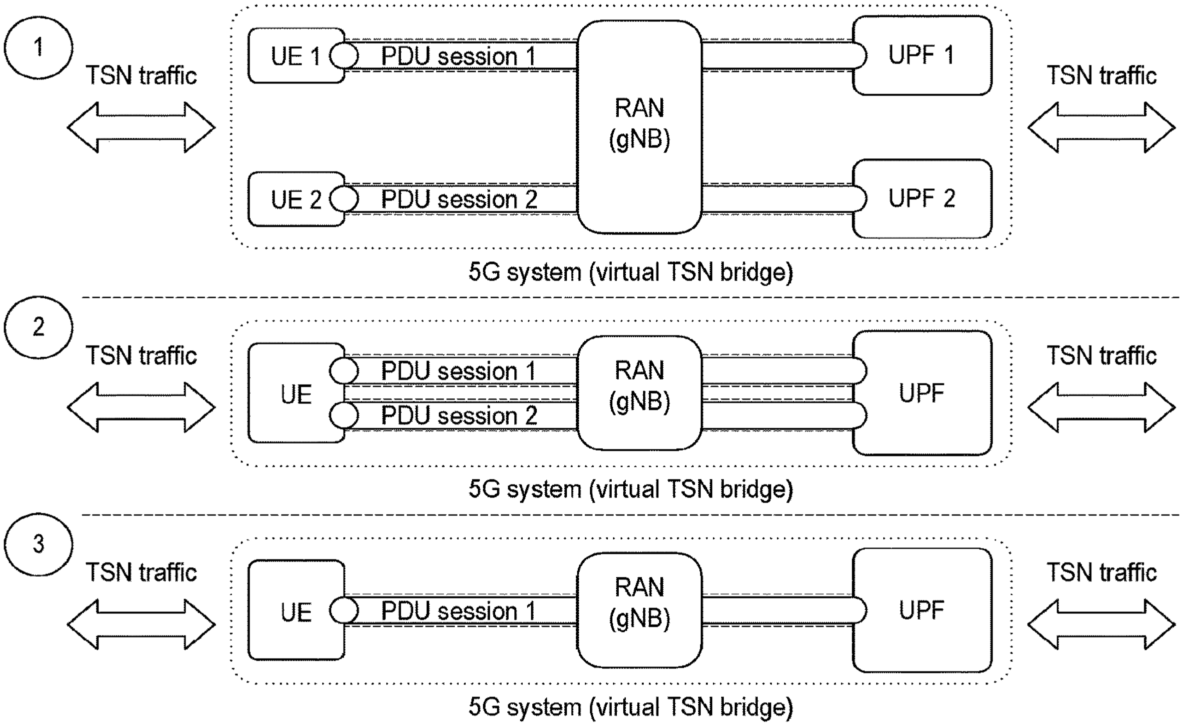
Figure 8:
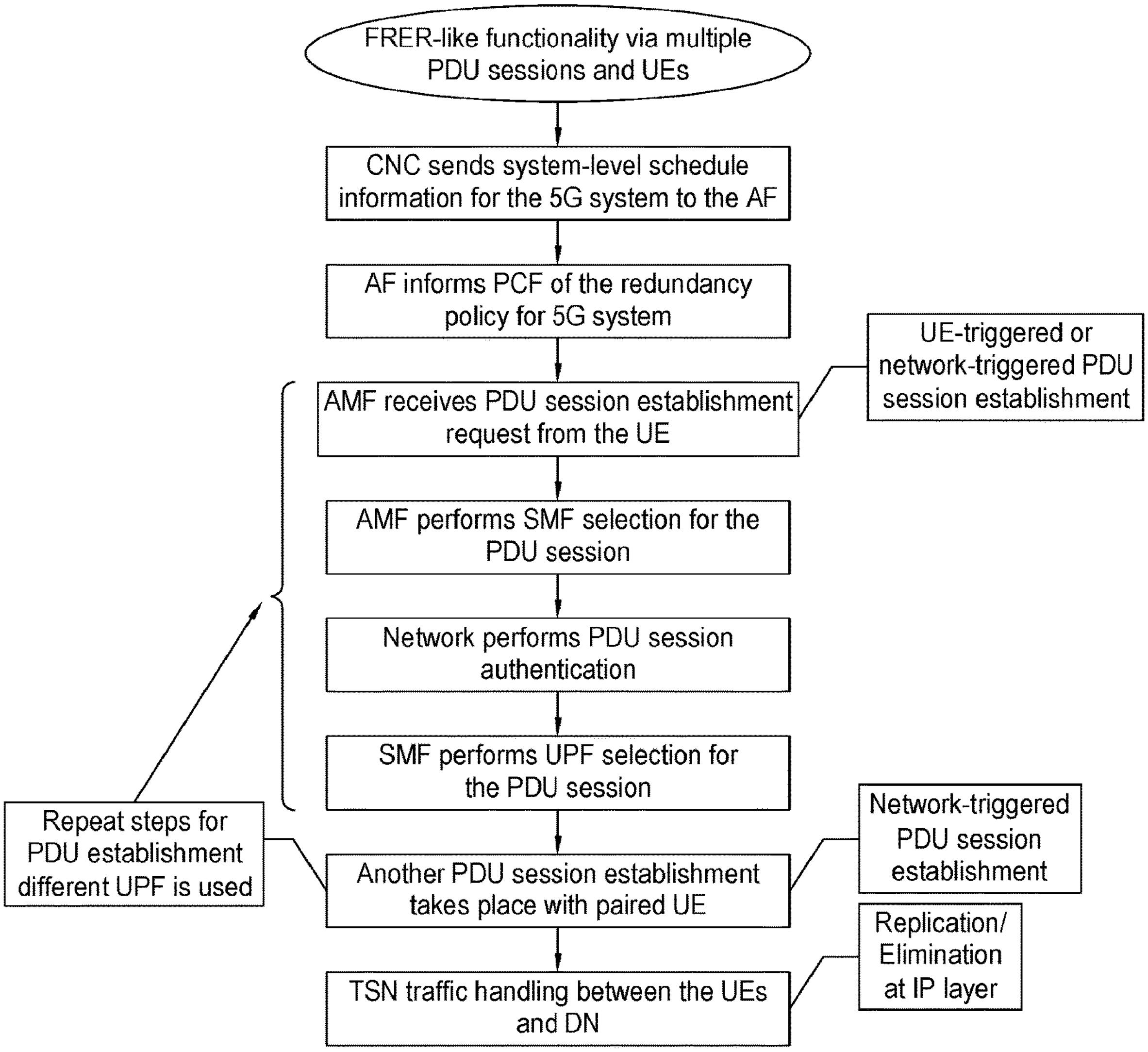
Figure 9:
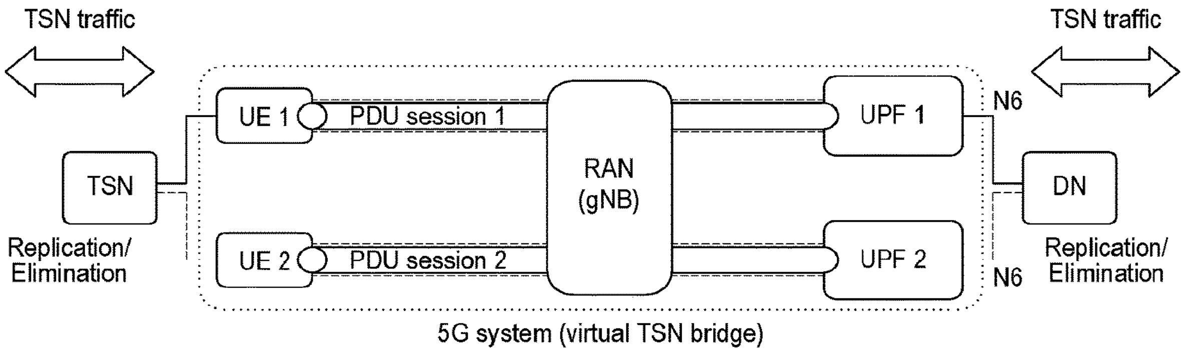
Figure 10:
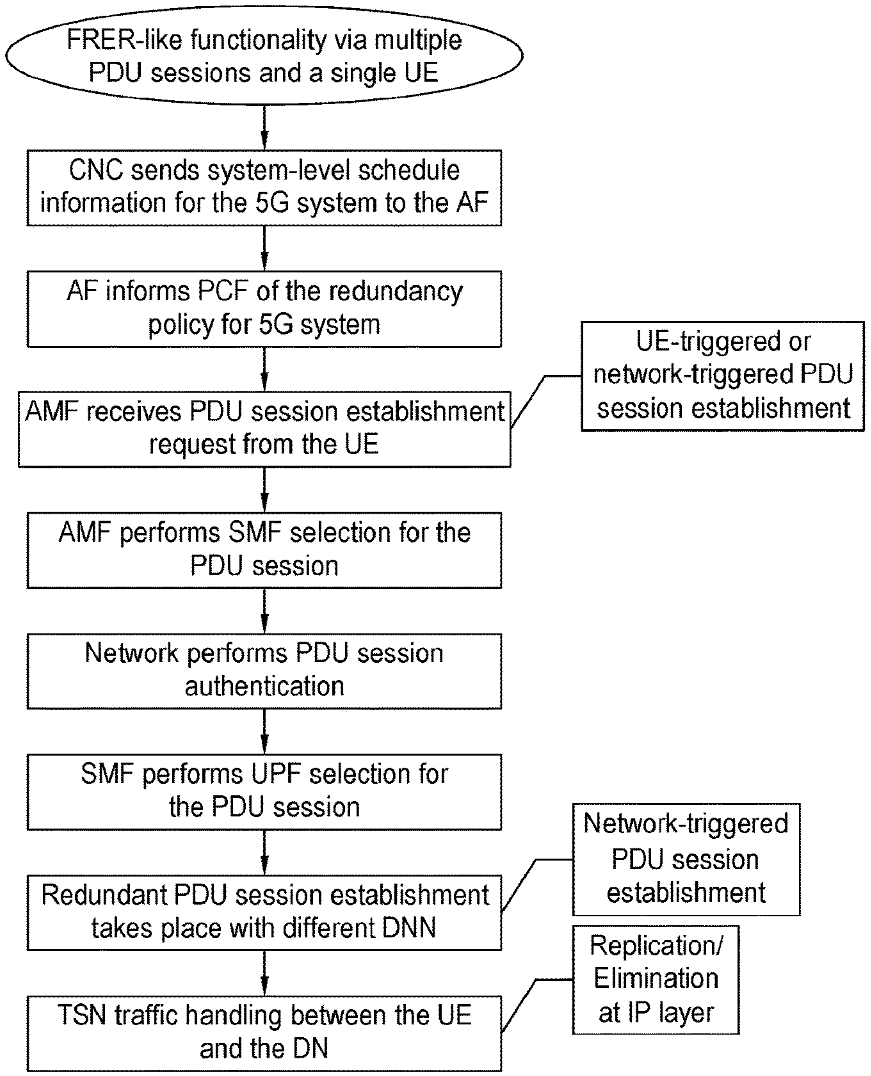
Figure 11:
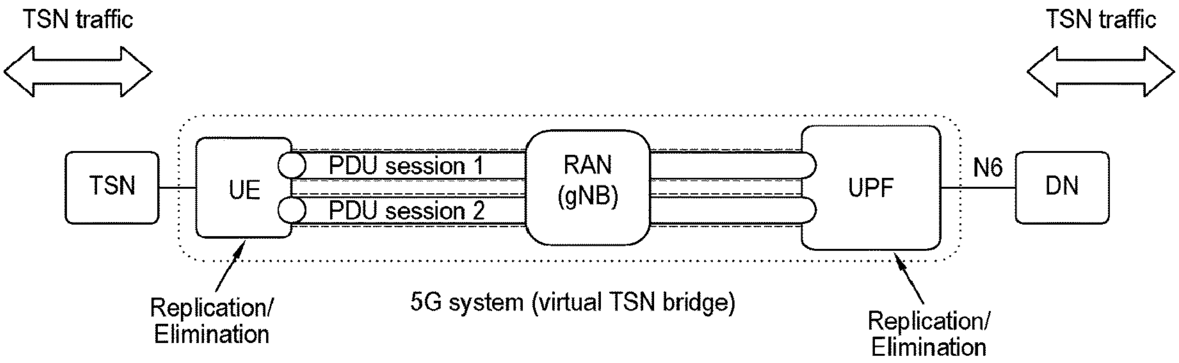
Figure 12:
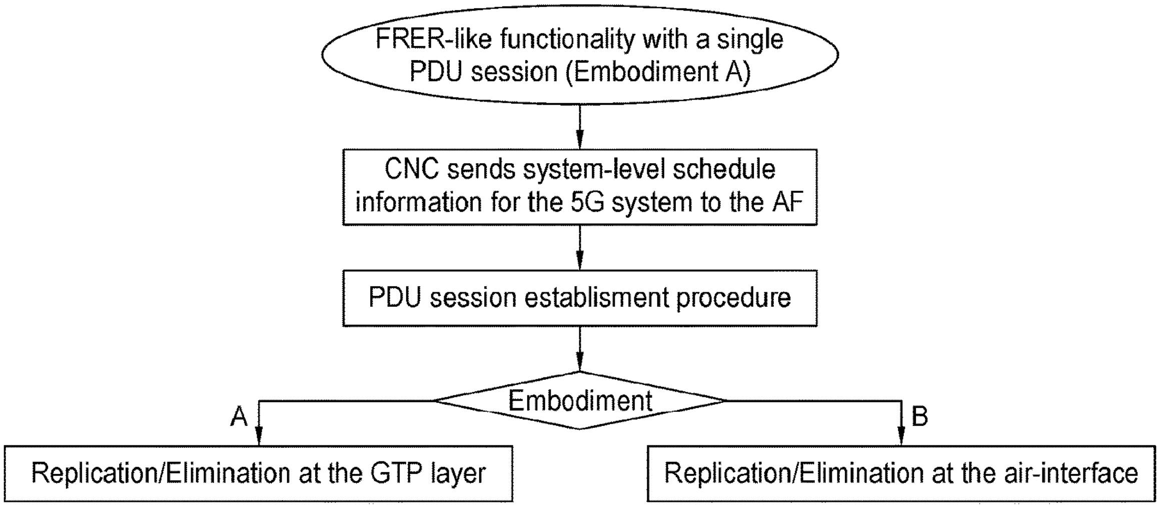
Figure 13:
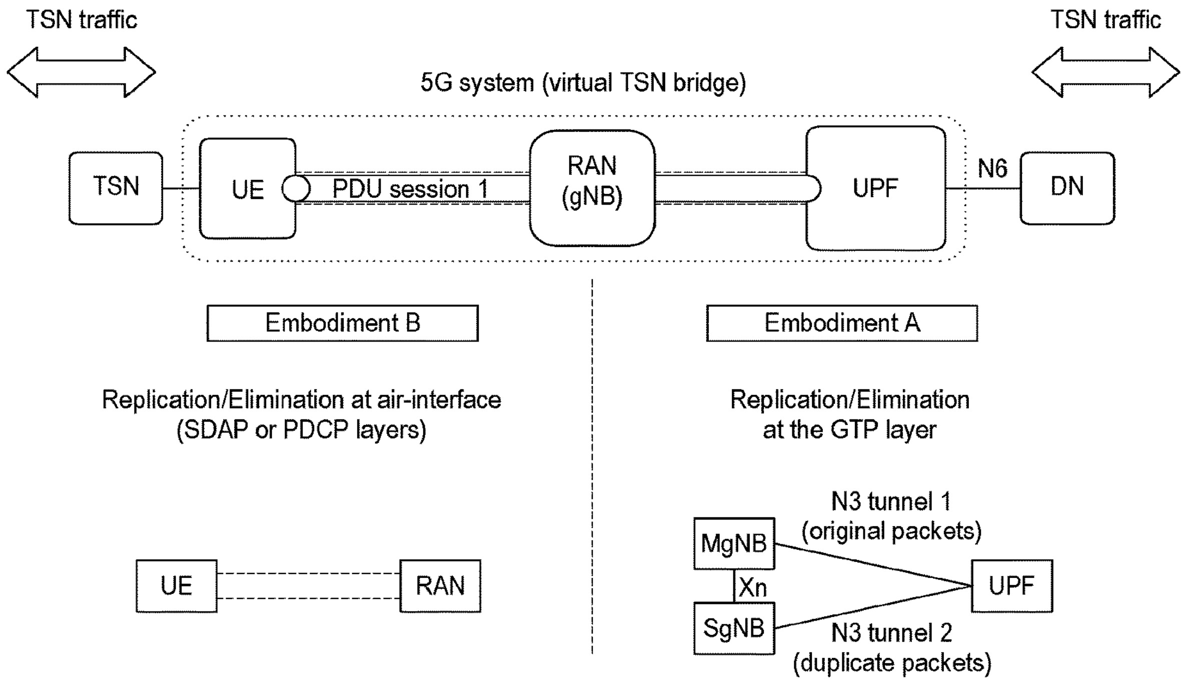
Figure 14:
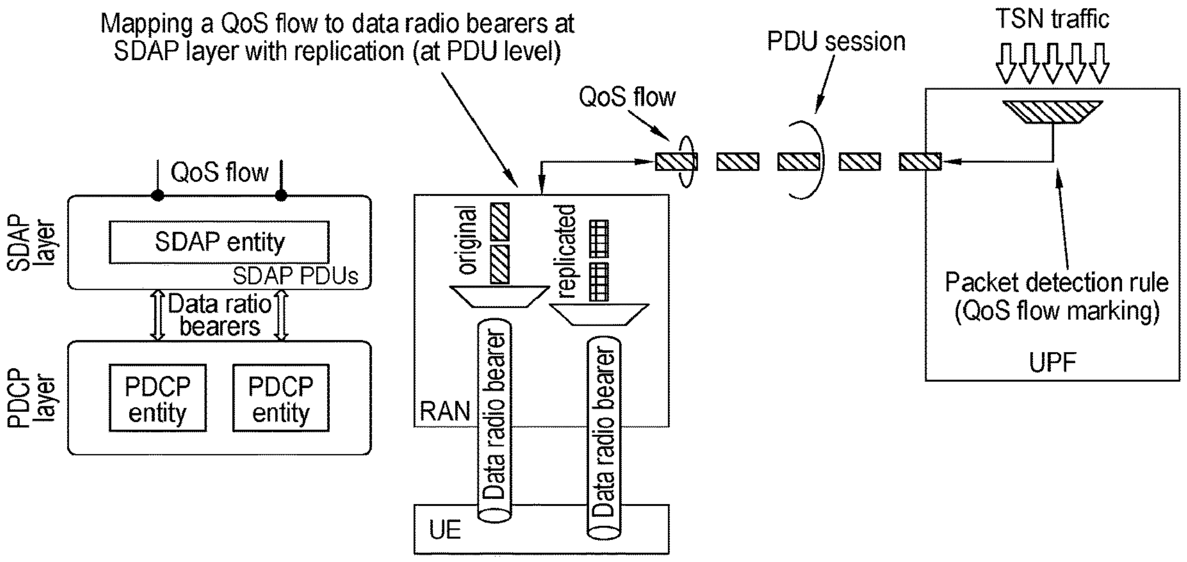
Figure 15:
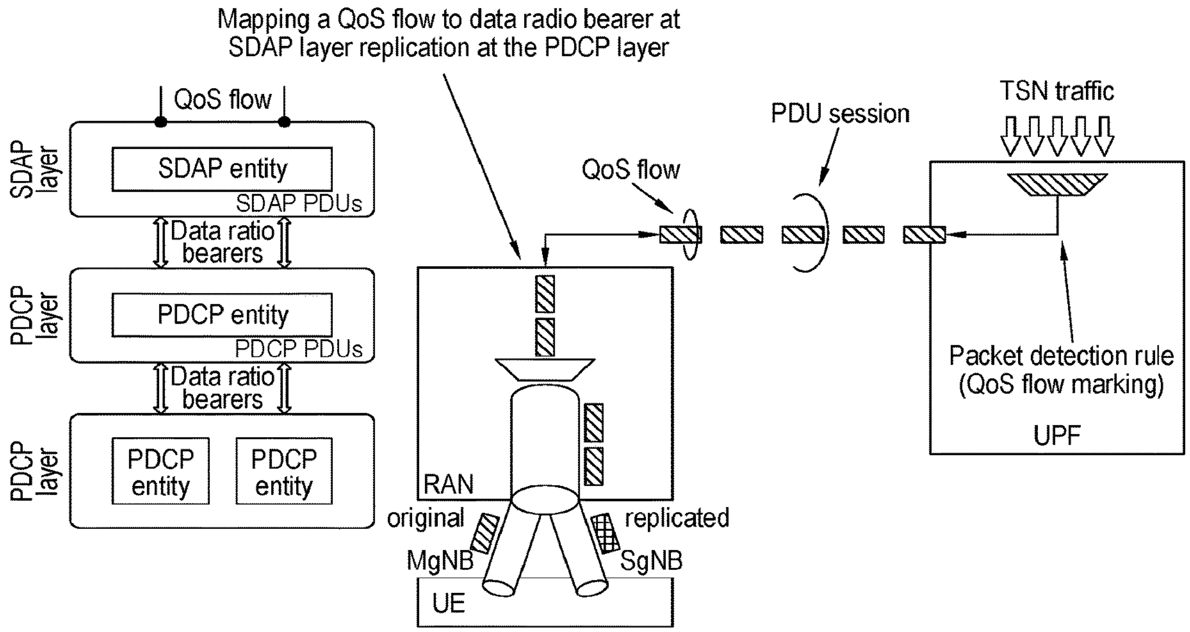

FIG. 3 shows a control plane protocol stack and user plane protocol stack for a 5G network, FIG. 4 shows an example of an integrated communications network, FIG. 5 shows a further example of an integrated communications network, FIG. 6 shows an example of a protocol data unit, PDU session in a 5G network, FIG. 7 shows a general overview of three embodiments, FIG. 8 shows a method according to the first embodiment, FIG. 9 shows an example implementation of the method of FIG. 8, FIG. 10 shows a method according to the second embodiment, FIG. 11 shows an example implementation of the method of FIG. 10, FIG. 12 shows a method according to a third embodiment, FIG. 13 shows an example implementation of the method of FIG. 12, FIG. 14 shows a first variant of the example implementation of the method of FIG. 12, and FIG. 15 shows a first variant of the example implementation of the method of FIG. 12.

DETAILED DESCRIPTION

According to an embodiment there is provided a method of transmitting data between a time-sensitive networking, TSN, system and a 5G network, the method comprising receiving, from the time-sensitive networking, TSN, system, data comprising a plurality of frames, defining k disjoint paths for transmitting the data across the 5G network, where k≥2 and for each frame of the data, performing, by the 5G network, at least one of the processes (a) and (b), (a) transmitting k copies of the frame to a transmission destination via a respective one of the disjoint paths; determining, based on a redundancy policy of the 5G network indicating a protocol for deleting redundant copies of frames of TSN traffic, whether one or more of the transmitted k copies received at the transmission destination are redundant; and eliminating the copies determined to be redundant and (b) generating, based on a redundancy policy of the 5G network indicating a protocol for replicating frames of TSN traffic, k copies of the frame and transmitting the copies of the frame to a transmission destination via a respective one of the disjoint paths.

In an embodiment the method further comprises receiving, by the 5G network, scheduling information indicating a timeslot for the receipt of the data at the 5G network.

In an embodiment the 5G network comprises a first user equipment, UE, and a data network, DN, and defining the k disjoint paths comprises establishing a connection between the first user equipment, UE, and the data network, DN.

In an embodiment establishing the connection comprises establishing at least one protocol data unit, PDU, session for the first user equipment, UE.

In an embodiment the 5G network further comprises a second user equipment, UE, and establishing the connection comprises establishing a first protocol data unit, PDU, session with the first user equipment, UE, and establishing a second protocol data unit, PDU, session with the second user equipment, UE.

In an embodiment establishing the first protocol data unit, PDU, session comprises selecting a first user plane function, UPF, for the first protocol data unit, PDU, session, and establishing the second protocol data unit, PDU, session comprises selecting a second user plane function, UPF, for the second protocol data unit, PDU, session.

In an embodiment at least one of (i) eliminating the copies determined to be redundant and (ii) generating, based on a redundancy policy of the 5G network indicating a protocol for replicating frames of TSN traffic, k copies of the frame is performed by the data network, DN, of the 5G network.

In an embodiment establishing the connection comprises establishing a first protocol data unit, PDU, session with the first user equipment, UE, and establishing a second protocol data unit, PDU, session with the first user equipment, UE.

In an embodiment the first protocol data unit, PDU, session is established via a first data network name, DNN, of the 5G network and the second protocol data unit, PDU, session is established via a second data network name, DNN, of the 5G network.

In an embodiment at least one of (i) eliminating the copies determined to be redundant and (ii) generating, based on a redundancy policy of the 5G network indicating a protocol for replicating frames of TSN traffic, k copies of the frame is performed by an IP layer of the 5G network, by a user plane function, UPF, of the 5G network, or by the first user equipment, UE.

In an embodiment establishing the connection comprises, by a user plane function, UPF, of the 5G network, establishing a first N3 tunnel and a second N3 tunnel for transmitting the data across the 5G network.

In an embodiment the first N3 tunnel connects the user-plane function, UPF, and a master base station, MgNB, and the second N3 tunnel connects the user-plane function, UPF, and a secondary base station, SgNB.

In an embodiment at least one of (i) eliminating the copies determined to be redundant and (ii) generating, based on a redundancy policy of the 5G network indicating a protocol for replicating frames of TSN traffic, k copies of the frame is performed by a GPRS Tunnelling Protocol, GTP, layer of the 5G network.

In an embodiment at least one of (i) eliminating the copies determined to be redundant and (ii) generating, based on a redundancy policy of the 5G network indicating a protocol for replicating frames of TSN traffic, k copies of the frame is performed by a layer of the air interface protocol stack of the 5G network.

In an embodiment the steps of (i) eliminating the copies determined to be redundant and (ii) generating, based on a redundancy policy of the 5G network indicating a protocol for replicating frames of TSN traffic, k copies of the frame are performed by a service data adaptation protocol, SDAP, layer of the 5G network.

In an embodiment the steps of (i) eliminating the copies determined to be redundant and (ii) generating, based on a redundancy policy of the 5G network indicating a protocol for replicating frames of TSN traffic, k copies of the frame are performed by a packet data convergence protocol, PDCP, layer of the 5G network.

According to an embodiment there is provided a method of transmitting data comprising a plurality of frames between a time-sensitive networking, TSN, system and a 5G network, the method comprising for each frame of the data, performing, by the time-sensitive networking, TSN, system, at least one of the processes (c) and (d): (c) based on a redundancy policy of the 5G network indicating a protocol for replicating frames of TSN traffic and a protocol for deleting redundant copies of frames of TSN traffic, obtaining k copies of the frame and transmitting the copies to a layer of the 5G network configured to eliminate, based on the redundancy policy, redundant copies of the frame and (d) receiving, from the 5G network, k copies of the frame; determining, based on a redundancy policy of the 5G network indicating a protocol for deleting redundant copies of frames of TSN traffic, whether one or more of the received copies are redundant; and eliminating the copies determined to be redundant.

In an embodiment transmitting the copies comprises allowing the received copies to pass with probability 1/Θ, where Θ is an average number of paths available in the 5G network for TSN traffic.

In an embodiment obtaining k copies of the frame comprises replicating received frames of the data with probability 1/Θ, where Θ is an average number of paths available in the 5G network for TSN traffic.

According to an embodiment there is provided one or more non-transitory storage media comprising computer instructions executable by a processor, the computer instructions when executed by the processor causing the processor to perform a method as described above. Integration of TSN and 5G systems creates a number of challenges. Converged operation of a heterogeneous network comprising TSN and 5G nodes becomes particularly challenging as the two technologies differ in capabilities and internal protocols. Extending 802.1CB capabilities to integrated TSN and 5G systems becomes particularly important for end-to-end fault tolerance, especially when disjoint paths are not always available.

According to an embodiment there is provided a device comprising a controller and memory storing instructions executable by the controller and configured to cause the controller, when executing the instructions, to perform any of the methods described above.

Figure 1:
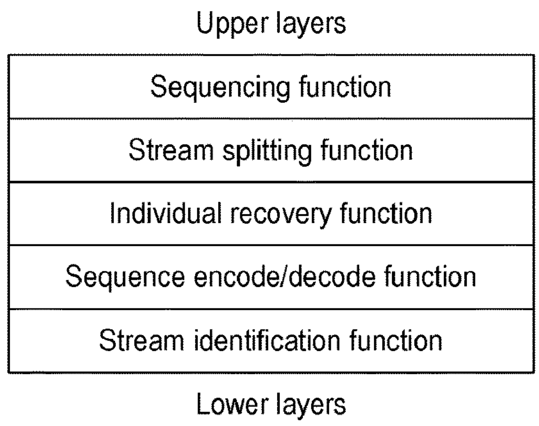
FIG. 1 shows a general example of a FRER protocol stack.

FIG. 1 shows a general example of a FRER protocol stack. The FRER protocol comprises two main mechanisms: (i) replication of streams (via different paths) at the TSN talkers (source nodes), and (ii) elimination of duplicates per stream at the relay nodes/TSN listeners (destination nodes). The sequence generation function generates a sequence number for each frame of a stream. The stream splitting function generates M copies for each frame of a stream to be forwarded via M disjoint (distinct) paths. The sequence encoding function assigns the generated sequence number to each frame using the redundancy tag (R-TAG) field of the Ethernet frame. The sequence decoding function extracts the sequence number from a received frame. The sequence recovery stage either accepts or discards a received frame. The sequence recovery function operates at the level of compound streams, i.e., frames received from all the paths. The individual recovery function operates at the level of a member stream, i.e., frames received from a single path. The stream identification function identifies the stream to which the frame belongs. The stream may be identified through source or destination MAC addresses or a VLAN ID in the Ethernet frame. Not all the above-listed functions may be included in all FRER protocol stacks.

Figure 2:
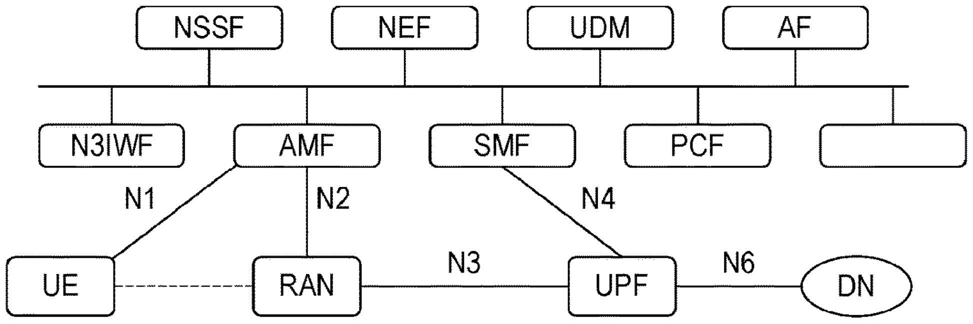
FIG. 2 shows a general example of a 5G core network architecture.

FIG. 2 shows a general example of a 5G core network architecture. The network comprises user equipment UE, radio access network RAN, user protocol function UPF, data network DN, network exposure function NEF, network slice selection function NSSF, non-3GPP interworking function N3IWF, access and mobility management function AMF, unified data management UDM, policy control function PCF, session management function SMF, and application function AF. The radio access network RAN, communicates with a user protocol function UPF via the N3 interface, and the user protocol function UPF communicates with the data network DN via the N6 interface. The access and mobility management function AMF communicates with user equipment UE via the N1 interface and with the radio access network RAN via the N2 interface.

FIG. 3 shows a control plane protocol stack and user plane protocol stack for a 5G network. The control plane protocol stack comprises non-access stratum NAS, radio resource control layer RRC, packet data convergence protocol layer PDCP, radio link control layer RLC, medium access control layer MAC, and physical layer PHY. The user plane protocol stack comprises service data adaptation protocol layer SDAP, packet data convergence protocol layer PDCP, radio link control layer RLC, medium access control MAC, and physical layer PHY.

FIG. 4 shows an example of an integrated communications network. The network comprises a plurality of TSN systems, each TSN system having an end station ES. The end stations ES may be talkers or listeners. The TSN system implements FRER functionality. The network further includes a 5G system, which comprises at least one user equipment (UE), a radio access network (RAN) comprising one or more base stations (gNBs), and a core network. The 5G system communicates with each of the TSN systems via a virtual TSN bridge.

The integrated network is managed by a centralized network configuration entity CNC, which communicates with each of the plurality of TSN systems and with the 5G network.

FIG. 5 shows a further example of an integrated communications network. The integrated network comprises two TSN systems A and B in communication with a 5G network, and a plurality of further TSN systems 1 . . . k in communication with TSN system A. Traffic from TSN system A may be transmitted to TSN system B via the 5G network. The TSN systems A and B may provide FRER functionality, and the 5G network may be configured to provide multi-path transmission.

FIG. 6 shows an example of a protocol data unit, PDU session in a 5G network. A PDU session serves to connect user equipment UE to a specific data network. The PDU sessions may be IP or Ethernet PDU sessions, and the establishment of the PDU sessions may be triggered by either the user equipment UE or by other nodes of the 5G network. Two data radio bearers DRB 1, DRB 2 are established in the PDU session (in variants of the example, one or more data radio bearers DRB are established in the PDU session). The 5G network further defines a plurality of quality of service data flows QoS, each flow having a distinct QoS flow identifier QFI (QFI X, QFI Y, QFI Z) and being mapped to one of the data radio bearers DRB 1 and DRB 2. Each of the QoS data flows is transmitted between the radio access network RAN and the user plane function UPF via the N3 interface of the 5G network.

FIG. 7 shows a general overview of three embodiments (1)-(3). In each of the embodiments, a 5G network comprising at least one user equipment UE and at least one base station gNB is configured to receive and transmit TSN traffic. Within the 5G network, TSN traffic is received and transmitted via at least one protocol data unit session PDU and at least one user plane function UPF.

In a first embodiment (1), the 5G network comprises two user equipments UE 1 and UE 2, and is configured to establish a first PDU session (PDU session 1) connecting UE 1 and the base station gNB and a second PDU session (PDU session 2) connecting UE 2 and the base station gNB. A first UPF (UPF 1) is established for the first PDU session and a second UPF (UPF 2) is established for the second PDU session. That is, two disjoint paths are established for transmitting TSN traffic within the 5G network.

In a second embodiment (2), the 5G network comprises a single user equipment UE and is configured to establish multiple redundant PDU sessions (PDU session 1, PDU session 2) connecting the UE and the base station gNB. A single UPF is established for both PDU sessions. The two PDU sessions are established via two distinct data network names, and thus provide two disjoint paths for transmitting TSN traffic within the 5G network. In variants of the embodiment, three or more redundant PDU sessions may be established by the 5G network.

In a third embodiment (3), the 5G network comprises a single user equipment UE and is configured to establish a single PDU session connecting the UE and the base station gNB. A single UPF is established for the PDU session. In this embodiment, multiple disjoint paths for transmitting TSN traffic within the 5G network may be provided by dual-connectivity techniques, i.e. establishing multiple N3 interfaces between the user plane function UPF and multiple base stations gNB, and/or by establishing multiple disjoint paths between the RAN and the UE.

Each of the embodiments (1)-(3) may be implemented in an integrated network as shown in FIG. 4 or FIG. 5.

FIG. 8 shows a method according to the first embodiment. The CNC of the integrated network sends system-level schedule information for the 5G network to the application function (AF) of the 5G network. The AF then informs the policy control function (PCF) of the 5G network of a redundancy policy for the 5G network. The system-level schedule information informs the 5G network of the time window during which the TSN traffic is expected to arrive at the 5G network. The redundancy policy indicates a type of TSN traffic handling mechanism supported by the 5G network, comprising a protocol for replicating frames of TSN traffic and a protocol for deleting redundant copies of frames of TSN traffic.

The 5G network comprises a plurality of UEs handling TSN traffic. These UEs may be identified through their international Mobile Subscriber identity (IMSI) or any other unique identifier. In response to the AF informing the PCF of the redundancy policy, a first UE transmits a first PDU session establishment request to the access and mobility management function (AMF) of the 5G network. The first PDU session establishment request may be triggered by the first UE or by the 5G network. In response to this, the AMF selects a session management function (SMF) for the first PDU session, and the core network of the 5G network performs authentication (authorisation) of the first PDU session. In response to the authentication of the PDU first session, the selected SMF selects a first user-plane function UPF for the authenticated first PDU session.

A second UE then transmits a second PDU session establishment request to the access and mobility management function (AMF) of the 5G network. The second PDU session establishment request is triggered by the 5G network. In response to this, the AMF selects a session management function (SMF) for the second PDU session, and the core network of the 5G network performs authentication (authorisation) of the second PDU session. In response to the authentication of the second PDU session, the selected SMF selects a second user-plane function UPF different from the first user-plane function UPF for the authenticated second PDU session. In this way, two PDU sessions having distinct endpoints (the first UE and the first UPF, the second UE and the second UPF) are established in the 5G network to handle TSN traffic, thus providing two disjoint paths for transmitting TSN traffic via the 5G network. In the embodiment of FIG. 8, replication of frames of TSN traffic and/or elimination of redundant copies of frames of TSN traffic are performed at an IP layer of the data network DN. The transmission of TSN traffic through the 5G network will be discussed further with reference to FIG. 9.

FIG. 9 shows an example implementation of the method of FIG. 8. The 5G network is connected to a TSN system via a virtual TSN bridge. TSN traffic comprising a plurality of frames of data may enter the 5G network from the UE side or from the network side. The frames of TSN traffic received by the 5G network are replicated by the data network DN (for example, by an IP layer of the data network, or by layer 2 of the data network where the PDU sessions are Ethernet PDU sessions) according to the redundancy policy of the 5G network. For example, k copies of each frame are generated, where k is the number of disjoint paths for transmitting TSN traffic in the 5G network. Each of the k copies is then transmitted to a transmission destination via a respective one of the disjoint paths. At the transmission destination—for example, a node of a TSN system—it is determined, based on the redundancy policy of the 5G network, whether one or more of the received copies of the frame is redundant, and the copies determined to be redundant are eliminated by the TSN node. (For example, the received copies may be eliminated to leave only a single copy of each frame.)

Alternatively, frames of TSN traffic to be transmitted via the 5G network may be replicated by a node of the TSN network based on a redundancy policy of the 5G network before being transmitted via the k disjoint paths of the 5G network. At the transmission destination—for example, a node of the data network—it is determined, based on the redundancy policy of the 5G network, whether one or more of the received copies of the frame is redundant, and the copies determined to be redundant are eliminated by the data network. In variants of the embodiment, both of the elimination and replication steps may be performed by the data network DN (e.g. by the IP layer/layer 2 of the data network).

The method according to the first embodiment may be implemented in an integrated network as shown in FIG. 4 or 5.

FIG. 10 shows a method according to a second embodiment.

The CNC of the integrated network sends system-level schedule information for the 5G network to the application function (AF) of the 5G network. In response to the AF informing the PCF of the redundancy policy, the UE transmits a first PDU session establishment request to the access and mobility management function (AMF) of the 5G network. The first PDU session establishment request may be triggered by the UE or by the 5G network. The first PDU session is established via a first data network name DNN. In response to this, the AMF selects a session management function (SMF) for the first PDU session, and the core network of the 5G network performs authentication (authorisation) of the first PDU session. In response to the authentication of the PDU first session, the selected SMF selects a user-plane function UPF for the authenticated first PDU session.

The UE then transmits a second PDU session establishment request to the access and mobility management function (AMF) of the 5G network to establish a redundant PDU session with the same UE. The second PDU session establishment request is triggered by the 5G network. The second PDU session is established via a second data network name DNN different from the first data network name DNN. In response to this, the AMF selects a session management function (SMF) for the second PDU session, and the core network of the 5G network performs authentication (authorisation) of the second PDU session. In response to the authentication of the second PDU session, the selected SMF selects the user-plane function UPF for the authenticated second PDU session. In this way, two PDU sessions having distinct data network names are established in the 5G network to handle TSN traffic, thus providing multiple disjoint paths for transmitting TSN traffic via the 5G network. In variants of the embodiment, three or more redundant PDU sessions may be established in the 5G network to handle TSN traffic. In the embodiment of FIG. 10, replication of frames of TSN traffic and/or elimination of redundant copies of frames of TSN traffic are performed at an IP layer of the data network DN.

The transmission of TSN traffic through the 5G network will be discussed further with reference to FIG. 11.

The 5G network is connected to a TSN system via a virtual TSN bridge. TSN traffic comprising a plurality of frames of data may enter the 5G network from the UE side or from the network side.

The frames of TSN traffic received by the 5G network are replicated by the 5G network (for example at the IP layer/layer 2 of the Ethernet protocol stack, at the UPF, or at the UE) according to the redundancy policy of the 5G network. For example, k copies of each frame are generated, where k is the number of disjoint paths for transmitting TSN traffic in the 5G network. Each of the k copies is then transmitted to a transmission destination via a respective one of the disjoint paths. At the transmission destination—(for example, the IP layer/layer 2 of the Ethernet protocol stack, the UPF, or the UE)—it is determined, based on the redundancy policy of the 5G network, whether one or more of the received copies of the frame is redundant, and received copies determined to be redundant are eliminated by the IP layer/layer 2 of the Ethernet protocol stack, by the UPF, or by the UE. (For example, the received copies may be eliminated to leave only a single copy of each frame.)

The method of FIG. 10 may be implemented in an integrated network as shown in FIG. 4 or FIG. 5.

FIG. 12 shows a method according to a third embodiment. The CNC of the integrated network begins the PDU establishment procedure by sending system-level schedule information for the 5G network to the application function (AF) of the 5G network. The AF then informs the policy control function (PCF) of the 5G network of a redundancy policy for the 5G network. The system-level schedule information informs the 5G network of the time window during which the TSN traffic is expected to arrive at the 5G network. The redundancy policy indicates a type of TSN traffic handling mechanism supported by the 5G network, comprising a protocol for replicating frames of TSN traffic and a protocol for deleting redundant copies of frames of TSN traffic.

In response to the AF informing the PCF of the redundancy policy, a UE transmits a PDU session establishment request to the access and mobility management function (AMF) of the 5G network. The PDU session establishment request may be triggered by the UE or by the 5G network. In response to this, the AMF selects a session management function (SMF) for the PDU session, and the core network of the 5G network performs authentication (authorisation) of the PDU session. In response to the authentication of the PDU first session, the selected SMF selects a user-plane function UPF for the authenticated PDU session.

Once the PDU session establishment procedure is complete, the frame replication and elimination may be handled via a number of different protocols. The transmission of TSN traffic through the 5G network will be discussed further with reference to FIG. 13.

According to a first protocol ('Embodiment A'), frame/packet replication and elimination takes place between the UPF and the RAN of the 5G network at the GPRS tunnelling protocol (GTP) layer. The GTP layer replicates frames of received TSN data according to the redundancy policy of the 5G network. For example, k copies of each frame are generated, where k is the number of disjoint paths for transmitting TSN traffic in the 5G network. Each of the k copies is then transmitted to a transmission destination via a respective one of the disjoint paths. At the transmission destination—(for example, the GTP layer)—it is determined, based on the redundancy policy of the 5G network, whether one or more of the received copies of the frame is redundant, and received copies determined to be redundant are eliminated by the GTP layer. (For example, the received copies may be eliminated to leave only a single copy of each frame.)

The UPF establishes two different N3 interfaces (tunnels) for transmitting TSN traffic. On the RAN side, the two N3 interfaces have separate end points enabled by dual-connectivity techniques where two different base stations gNB are used: a master gNB (MgNB) and a secondary gNB (SgNB). Thus, two disjoint paths for transmitting TSN traffic through the 5G network are provided. The two base stations gNB are connected via the Xn interface.

According to the second protocol ('Embodiment B'), frame/packet replication and elimination takes place between the UE and the RAN at different layers of the air-interface. For example, replication and elimination takes place at the service data adaptation protocol (SDAP) layer which handles mapping of QoS flows to data radio bearers, as shown in FIG. 14. The SDAP layer duplicates the SDAP PDUs and adds another PDCP entity such that the original and replicated PDUs are sent via two different data radio bearers (DRBs).

Alternatively, frame replication and elimination may take place at the packet data convergence protocol (PDCP) layer of the 5G network, as shown in FIG. 15. The PDCP layer replicates the PDCP PDUs. It adds another radio link control (RLC) entity and performs a bearer split operation such that the original and the replicated PDUs are sent via two disjoint paths: one via the master gNB MgNB and the other via the secondary gNB SgNB.

In embodiments, the first protocol and second protocol may both be implemented.

The method of FIG. 12 may be implemented in an integrated network as shown in FIG. 4 or FIG. 5.

The replication and elimination techniques described above may be combined in embodiments. For example, multiple PDU sessions may be used while replication/elimination techniques are implemented within a single PDU session, thereby providing additional disjoint paths for data transmission and increasing the reliability of data transmission within the network.

In variants of the above embodiments, an FRER-compliant TSN node transmitting traffic toward the 5G network dynamically eliminates received replicated frames (i.e. frames replicated by the FRER protocol of the TSN system) from multiple paths based on the level of redundant paths available in the 5G network. A TSN node transmitting traffic towards the 5G network may allow (forward) received replicated frames from 'k' paths with probability 1/Θ, where Θ is an average number of paths available in the 5G network for TSN traffic. The average number of paths in the 5G network may be calculated as follows:

[Paths_UE-RAN+Paths_RAN-Core]/2 where Paths_UE-RAN denotes the total number of available paths for redundant traffic between the UE and the RAN of the 5G network, and Paths_RAN-Core is the total number of available paths for redundant traffic between the RAN and the core network of the 5G network. For instance, in the case of 2 independent PDU sessions (either with a single UE or multiple UEs), the average number of paths is 2; in the case of a single PDU session with replication/elimination at the air interface or at the N3 interface, the average number of paths is 1.5, and in the case where multi-path transmissions are not supported by the 5G network, the average number of paths is 1.

In variants of the above embodiments, a TSN node receiving traffic from the 5G network replicates received frames (over 'k' available paths) with probability 1/Θ where Θ is the average number of paths available in a 5G system for TSN traffic.

The information about the average number of paths in the 5G network may be shared with the TSN nodes via the CNC.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of transmitting data via a virtual time-sensitive networking, TSN, bridge between a TSN system and a 5G network, the method comprising:

receiving, via the virtual TSN bridge from the TSN system, data comprising a plurality of frames;

defining k disjoint paths for transmitting the data across the 5G network, where k≥2;

for each frame of the data, performing, by the 5G network, processes (a) and (b):

(a) transmitting k copies of the frame to a transmission destination via a respective one of the disjoint paths; determining, based on a first redundancy policy of the 5G network indicating a protocol for deleting redundant copies of frames of TSN traffic, whether one or more of the transmitted k copies received at the transmission destination are redundant; and eliminating the copies determined to be redundant; and (b) generating, based on a second redundancy policy of the 5G network indicating a protocol for replicating frames of TSN traffic, k copies of the frame; and transmitting the copies of the frame to a transmission destination via a respective one of the disjoint paths, wherein the TSN system implements frame replication and elimination for reliability, FRER, functionality and includes a station configured to transmit and receive between TSN systems, and the 5G network includes at least one user equipment, UE, and at least one base station; and for each frame of the data, performing, by the TSN system, processes (c) and (d):

(c) based on the first redundancy policy of the 5G network indicating a protocol for deleting redundant copies of frames of TSN traffic and based on the second redundancy policy of the 5G network indicating a protocol for replicating frames of TSN traffic, obtaining k copies of the frame; and transmitting via the virtual TSN bridge the copies to a layer of the 5G network configured to eliminate, based on the first redundancy policy and the second redundancy policy, redundant copies of the frame; and (d) receiving, via the virtual TSN bridge from the 5G network, k copies of the frame; determining, based on the first redundancy policy of the 5G network indicating a protocol for deleting redundant copies of frames of TSN traffic, whether one or more of the received copies are redundant; and eliminating the copies determined to be redundant, wherein transmitting the copies comprises allowing the received copies to pass with probability 1/Θ, where Θ is an average number of paths available in the 5G network for TSN traffic.

2. The method according to claim 1, wherein the 5G network comprises a first user equipment, UE, and a data network, DN, and defining the k disjoint paths comprises establishing a connection between the first user equipment, UE, and the data network, DN.

3. The method according to claim 2, wherein establishing the connection comprises establishing at least one protocol data unit, PDU, session for the first user equipment, UE.

4. The method according to claim 3, wherein the 5G network further comprises a second user equipment, UE, and establishing the connection comprises establishing a first protocol data unit, PDU, session with the first user equipment, UE, and establishing a second protocol data unit, PDU, session with the second user equipment, UE.

5. The method according to claim 4, wherein establishing the first protocol data unit, PDU, session comprises selecting a first user plane function, UPF, for the first protocol data unit, PDU, session, and establishing the second protocol data unit, PDU, session comprises selecting a second user plane function, UPF, for the second protocol data unit, PDU, session.

6. The method according to claim 4, wherein (a) eliminating the copies determined to be redundant and (b) generating, based on the second redundancy policy of the 5G network indicating a protocol for replicating frames of TSN traffic, k copies of the frame are performed by the data network, DN, of the 5G network.

7. The method according to claim 3, wherein establishing the connection comprises establishing a first protocol data unit, PDU, session with the first user equipment, UE, and establishing a second protocol data unit, PDU, session with the first user equipment, UE.

8. The method according to claim 7, wherein the first protocol data unit, PDU, session is established via a first data network name, DNN, of the 5G network and the second protocol data unit, PDU, session is established via a second data network name, DNN, of the 5G network.

9. The method according to claim 7, wherein (a) eliminating the copies determined to be redundant and (b) generating, based on the second redundancy policy of the 5G network indicating a protocol for replicating frames of TSN traffic, k copies of the frame are performed: by an IP layer of the 5G network, by a user plane function, UPF, of the 5G network, or by the first user equipment, UE.

10. The method according to claim 3, wherein establishing the connection comprises, by a user plane function, UPF, of the 5G network, establishing a first N3 tunnel and a second N3 tunnel for transmitting the data across the 5G network.

11. The method according to claim 10, wherein the first N3 tunnel connects the user plane function, UPF, and a master base station, MgNB, and the second N3 tunnel connects the user plane function, UPF, and a secondary base station, SgNB.

12. The method according to claim 10, wherein (a) eliminating the copies determined to be redundant and (b) generating, based on the second redundancy policy of the 5G network indicating a protocol for replicating frames of TSN traffic, k copies of the frame are performed by a GPRS Tunnelling Protocol, GTP, layer of the 5G network.

13. The method according to claim 10, wherein (a) eliminating the copies determined to be redundant and (b) generating, based on the second redundancy policy of the 5G network indicating a protocol for replicating frames of TSN traffic, k copies of the frame are performed by a layer of an air interface protocol stack of the 5G network.

14. The method according to claim 10, wherein (a) eliminating the copies determined to be redundant and (b) generating, based on the second redundancy policy of the 5G network indicating a protocol for replicating frames of TSN traffic, k copies of the frame are performed by a service data adaptation protocol, SDAP, layer of the 5G network.

15. The method according to claim 10, wherein (a) eliminating the copies determined to be redundant and (b) generating, based on the second redundancy policy of the 5G network indicating a protocol for replicating frames of TSN traffic, k copies of the frame are performed by a packet data convergence protocol, PDCP, layer of the 5G network.

16. A method of transmitting data via a virtual time-sensitive networking, TSN, bridge between a TSN system and a 5G network, the method comprising:

receiving, via the virtual TSN bridge from the TSN system, data comprising a plurality of frames;

defining k disjoint paths for transmitting the data across the 5G network, where $k \geq 2$;

for each frame of the data, performing, by the 5G network, processes (a) and (b):

(a) transmitting k copies of the frame to a transmission destination via a respective one of the disjoint paths; determining, based on a first redundancy policy of the 5G network indicating a protocol for deleting redundant copies of frames of TSN traffic, whether one or more of the transmitted k copies received at the transmission destination are redundant; and eliminating the copies determined to be redundant; and (b) generating, based on a second redundancy policy of the 5G network indicating a protocol for replicating frames of TSN traffic, k copies of the frame; and transmitting the copies of the frame to a transmission destination via a respective one of the disjoint paths, wherein the TSN system implements frame replication and elimination for reliability, FRER, functionality and includes a station configured to transmit and receive between TSN systems, and the 5G network includes at least one user equipment, UE, and at least one base station; and for each frame of the data, performing, by the TSN system, processes (c) and (d):

(c) based on the first redundancy policy of the 5G network indicating a protocol for deleting redundant copies of frames of TSN traffic and based on the second redundancy policy of the 5G network indicating a protocol for replicating frames of TSN traffic, obtaining k copies of the frame; and transmitting via the virtual TSN bridge the copies to a layer of the 5G network configured to eliminate, based on the first redundancy policy and the second redundancy policy, redundant copies of the frame; and (d) receiving, via the virtual TSN bridge from the 5G network, k copies of the frame; determining, based on the first redundancy policy of the 5G network indicating a protocol for deleting redundant copies of frames of TSN traffic, whether one or more of the received copies are redundant; and eliminating the copies determined to be redundant, wherein obtaining k copies of the frame comprises replicating received frames of the data with probability $1/\Theta$, where $\Theta$ is an average number of paths available in the 5G network for TSN traffic.

17. One or more non-transitory storage media comprising computer instructions executable by a processor, the computer instructions when executed by the processor causing the processor to perform a method of transmitting data via a virtual time-sensitive networking, TSN, bridge between a TSN system and a 5G network, the method comprising:

receiving, via the virtual TSN bridge from the TSN system, data comprising a plurality of frames;

defining k disjoint paths for transmitting the data across the 5G network, where $k \geq 2$;

for each frame of the data, performing, by the 5G network, processes (a) and (b):

(a) transmitting k copies of the frame to a transmission destination via a respective one of the disjoint paths; determining, based on a first redundancy policy of the 5G network indicating a protocol for deleting redundant copies of frames of TSN traffic, whether one or more of the transmitted k copies received at the transmission destination are redundant; and eliminating the copies determined to be redundant; and (b) generating, based on a second redundancy policy of the 5G network indicating a protocol for replicating frames of TSN traffic, k copies of the frame; and transmitting the copies of the frame to a transmission destination via a respective one of the disjoint paths, wherein the TSN system implements frame replication and elimination for reliability, FRER, functionality and includes a station configured to transmit and receive between TSN systems, and the 5G network includes at least one user equipment, UE, and at least one base station; and for each frame of the data, performing, by the TSN system, processes (c) and (d):

(c) based on the first redundancy policy of the 5G network indicating a protocol for deleting redundant copies of frames of TSN traffic and based on the second redundancy policy of the 5G network indicating a protocol for replicating frames of TSN traffic, obtaining k copies of the frame; and transmitting via the virtual TSN bridge the copies to a layer of the 5G network configured to eliminate, based on the first redundancy policy and the second redundancy policy, redundant copies of the frame; and (d) receiving, via the virtual TSN bridge from the 5G network, k copies of the frame; determining, based on the first redundancy policy of the 5G network indicating a protocol for deleting redundant copies of frames of TSN traffic, whether one or more of the received copies are redundant; and eliminating the copies determined to be redundant, wherein transmitting the copies comprises allowing the received copies to pass with probability $1/\Theta$, where $\Theta$ is an average number of paths available in the 5G network for TSN traffic.

* * * * *